DE WITT C. BAILEY.
HOSE COUPLING.
APPLICATION FILED APR. 27, 1912.
1,143,020.
Patented June 15, 1915.
2 SHEETS—SHEET 1.
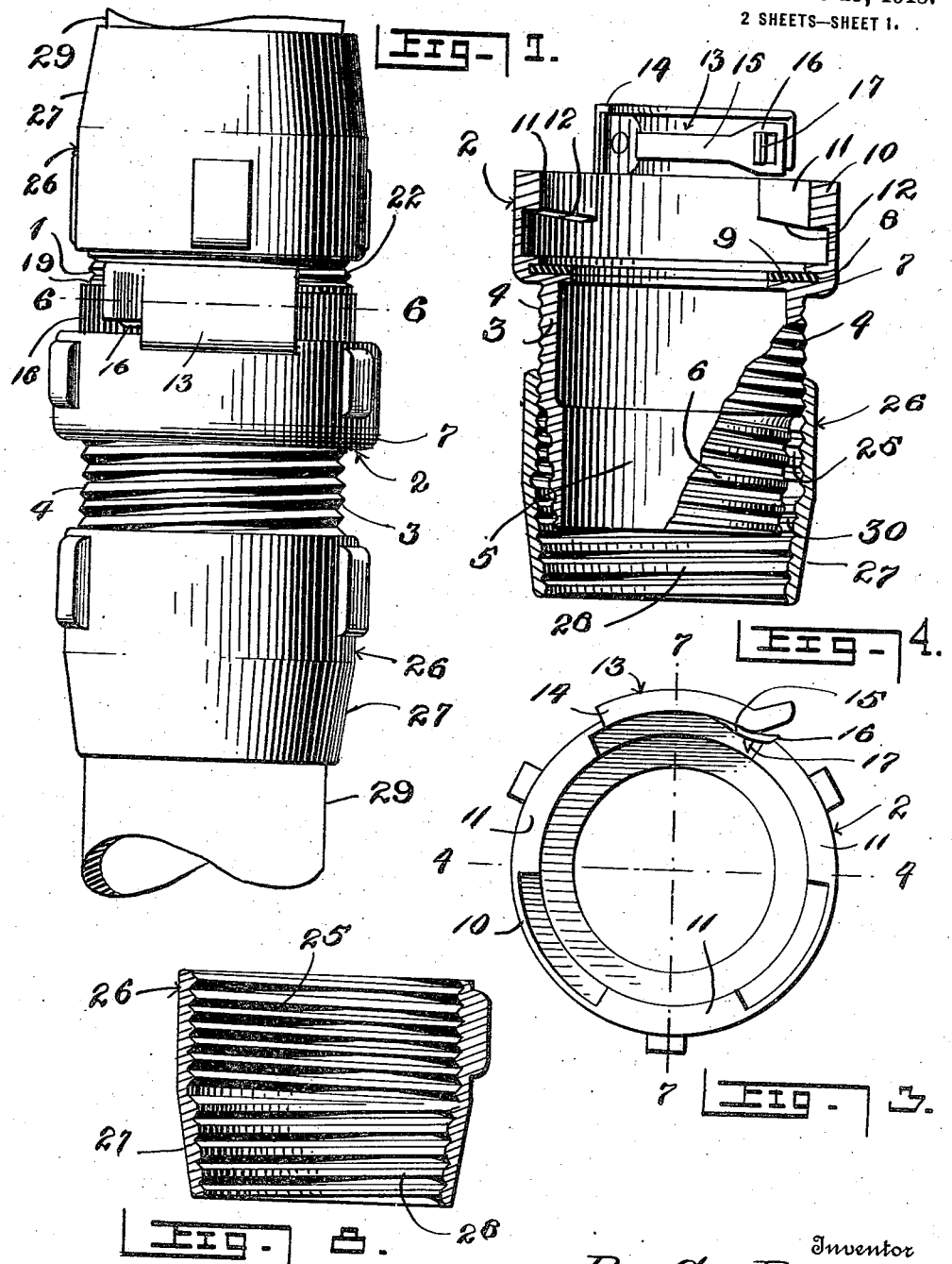
Inventor
D. C. Bailey.

DE WITT C. BAILEY.
HOSE COUPLING.
APPLICATION FILED APR. 27, 1912.
1,143,020.
Patented June 15, 1915.
2 SHEETS—SHEET 2.
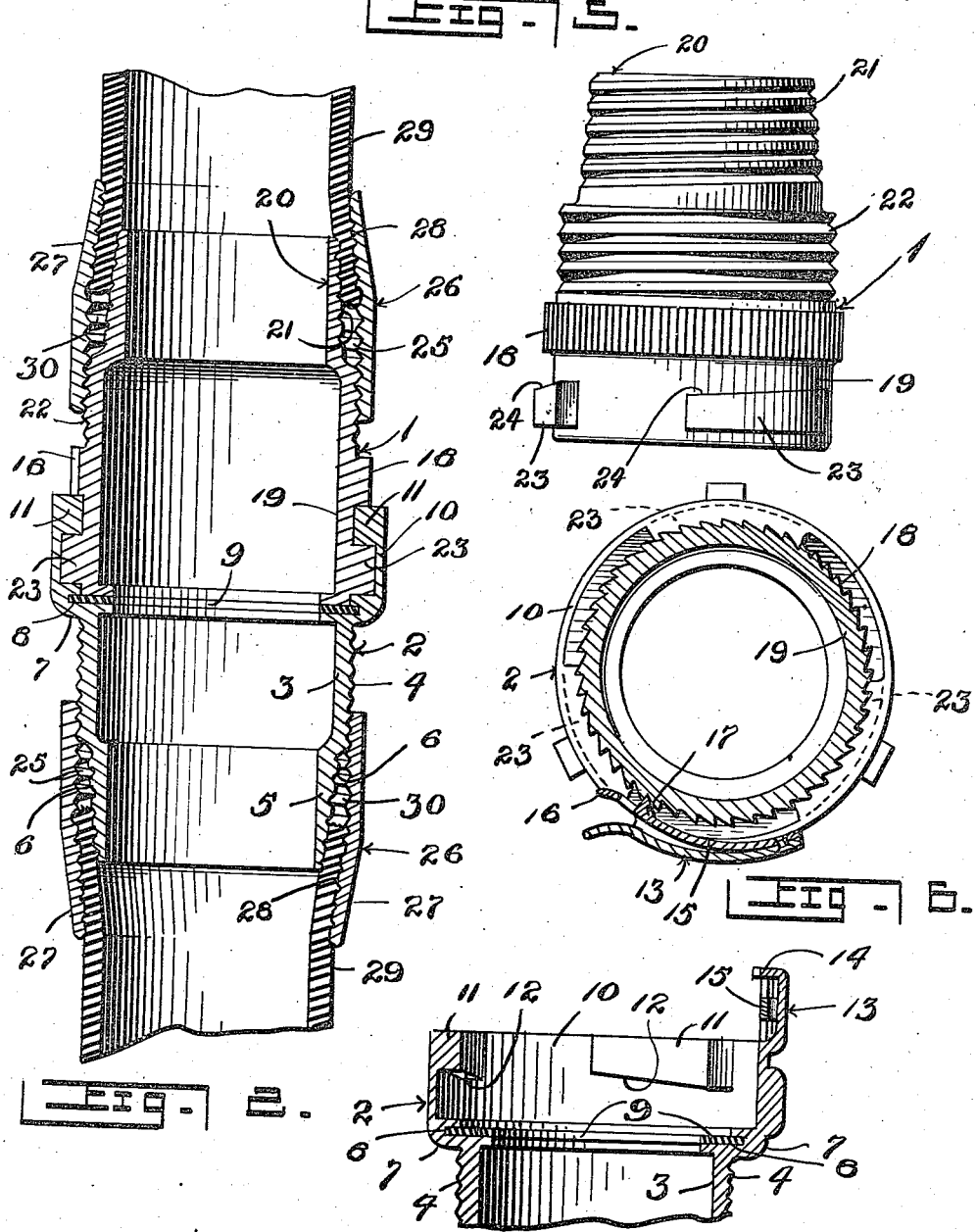

UNITED STATES PATENT OFFICE.

DE WITT C. BAILEY, OF NICHOLS, FLORIDA.

HOSE-COUPLING.

1,143,020.  Specification of Letters Patent.  Patented June 15, 1915.

Application filed April 27, 1912. Serial No. 693,678.

*To all whom it may concern:*

Be it known that I, DE WITT C. BAILEY, a citizen of the United States, residing at Nichols, in the county of Polk, State of Florida, have invented certain new and useful Improvements in Hose-Couplings; and I do hereby declare the following to be a full, clear, and exact description of the invention, such as will enable others skilled in the art to which it appertains to make and use the same.

This invention relates to that type of hose couplings wherein the coupling members are correlatively rotated into and out of interlocking position, the object of the invention being to provide such a novel construction and arrangement of latch in connection with a circumscribing latch on one of the members as will be proof against blows or pressure in the direction of the coupling, such as is encountered in the use of a fire hose that is drawn over rough ground, over fences, house tops and similar places, a further object being to so form the latch that while it is not susceptible to these adverse conditions, it may be easily disengaged when it is desired to uncouple the coupling members.

With these and other objects in view, this invention resides in the novel features of construction, formations, combinations and arrangements of parts to be hereinafter more fully described, claimed and illustrated in the accompanying drawings, in which:—

Figure 1 is an elevation showing the parts in their coupled position. Fig. 2 is a longitudinal sectional view through the same. Fig. 3 is a top plan view of the female member. Fig. 4 is a sectional view on line 4—4 of Fig. 3. Fig. 5 is an elevation of the male member. Fig. 6 is a sectional view on line 6—6 of Fig. 1. Fig. 7 is a similar view on line 7—7 of Fig. 3. Fig. 8 is a longitudinal sectional view through one of the clamping sleeves.

Referring to the drawings, the numerals 1 and 2 designate the male and female members, respectively.

The female member 2 consists of a tubular section 3, the outer surface of which is formed with threads 4. Formed integral with the tubular section 3 is a reduced extension 5, the same being formed upon its outer surface with spirally arranged ribs 6, the pitch thereof being the same as the threads 4.

The upper end of the tubular section 3 terminates in a shoulder 7, which is formed interiorly with an annular groove 8, which serves to retain a rubber gasket 9 in place.

The shoulder 7 terminates in an annular flange 10 which is formed internally with projecting lugs 11, said lugs being spaced an equal distance apart, and have their lower edges inclined, as at 12, the purpose of which will appear later.

Formed integrally with the flange 10 is a projected longitudinally curved plate 13 having its outer edge provided with an inturned flange 14. Rigidly connected at one end to the inner surface of the plate 13 is a resilient finger 15, curved to correspond to the curvature of the flange, the free end of which being formed with a head 16 having struck inwardly therefrom a tooth 17, said tooth being adapted to engage the series of annually arranged ratchet teeth 18 formed upon the tubular section 19 of the male member 1.

The male member 1 further consists of a reduced extension 20, which is formed exteriorly with spirally arranged ribs 21, said ribs being arranged in the same pitch as the threads 22 formed upon the male member 1, and rearwardly of the ratchet teeth 18.

Formed near the end of the tubular portion 19 of the male member 1 is a plurality of spaced outwardly projecting lugs 23, said lugs having certain of their edges inclined, as at 24, said inclined edges being adapted to contact with the inclined edges 12 of the lugs 11 formed with the female member, thus limiting the relative rotation of the male and female members, and at the same time forcing the edge of the male member 1 in tight engagement with the gasket 9 carried by the female member, thus insuring a water tight joint at this point.

Adapted to engage the threads 6 and threads 22 of the respective members are the internal threads 25 of the clamping sleeves 26, each of which have their outer ends slightly tapered as at 27, said outer ends being formed with spirally arranged interior ribs 28, said ribs 26 being pitched left, and the threads 25 being pitched right so that when the ends of the hose 29 are inserted in the space 30 the same will have the tendency to be drawn inwardly when the clamping sleeves 26 are rotated, thus firmly holding the hose against accidental displacement.

When it is desired to uncouple the members it is only necessary that pressure be applied to the head 16 of the spring finger 15, thereby disengaging the tooth 17 from the ratchet teeth 18, whereupon the members may be rotated until the lugs 11 and 23 clear each other, and at which time the members may be uncoupled. It will be further noted that when the members are in their coupled position, the spring finger 15, owing to its engagement with the ratchet teeth will prevent accidental displacement of the members.

It is a well known fact that fire hose are subjected to twisting and pulling during the time of use and consequently the danger of the hose sections becoming uncoupled is great, but by securing the finger 15 to the inner surface of the flange 13 this danger is eliminated as the flange effectually protects the finger to prevent the same from coming in contact with any object that may tend to actuate the finger accidentally.

By providing the male and female members with the threaded portions 4 and 22, either one may be screwed into a fire plug upon removal of one of the clamping sleeves 26.

What is claimed is:—

1. The combination with a hose coupling comprising interlocked members constructed for correlative rotation into and out of interlocking engagement, one of said members having a circumscribing ratchet, of a segmental plate carried by the other member and adapted to overlie a portion of the ratchet when the members are assembled ready for said correlative rotation, and a latch not susceptible to pressure in the direction of the coupling and consisting of a curved spring finger, carried by the plate and lying wholly between it and the ratchet and partly circumscribing the ratchet, said finger having a free end portion directed away from its arc of curvature and having also a tooth struck therefrom into position to successively engage the teeth of the ratchet when said members are given their interlocking correlative rotation, the free longitudinal edge portion of the plate having a latch-protecting flange depending beyond the corresponding longitudinal edge of the finger.

2. The combination with a hose coupling comprising interlocked members constructed for correlative rotation into and out of locking engagement, one of said members having a circumscribing ratchet, of a segmental housing projecting from the other member and adapted to overlie a portion of the ratchet when the members are assembled ready for said correlative rotation, and a curved spring finger fastened at one end to the housing and completely concealed thereby when the coupling members are assembled, the free end of said finger having an inwardly projecting tooth adapted to successively engage the teeth of the ratchet when the members are given their interlocking correlative rotation.

In testimony whereof, I affix my signature, in presence of two witnesses.

DE WITT C. BAILEY.

Witnesses:
 FRANCIS BOYLE,
 GEO. H. CHANDLER.